(12) United States Patent
Plachetka et al.

(10) Patent No.: US 12,000,808 B2
(45) Date of Patent: Jun. 4, 2024

(54) FLUID SUPPLY DEVICES AND FLUID MEMBER FOR FORMING A MOBILE PHASE FOR A SAMPLE SEPARATING DEVICE

(71) Applicant: Agilent Technologies, Inc., Santa Clara, CA (US)

(72) Inventors: Clemens Plachetka, Malsch (DE); Konstantin Shoykhet, Karlsruhe (DE); Tony Ziegler, Steinfeld (DE); Joachim-Richard Wagner, Ettlingen (DE); Manfred Berndt, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 231 days.

(21) Appl. No.: 17/348,531

(22) Filed: Jun. 15, 2021

(65) Prior Publication Data

US 2021/0389285 A1     Dec. 16, 2021

(30) Foreign Application Priority Data

Jun. 15, 2020   (DE) .................... 102020115737.1

(51) Int. Cl.
| | |
|---|---|
| *B01D 15/14* | (2006.01) |
| *G01N 30/02* | (2006.01) |
| *G01N 30/20* | (2006.01) |
| *G01N 30/32* | (2006.01) |
| *G01N 30/36* | (2006.01) |

(52) U.S. Cl.
CPC ............. *G01N 30/36* (2013.01); *B01D 15/14* (2013.01); *G01N 30/20* (2013.01); *G01N 30/32* (2013.01); *G01N 2030/027* (2013.01); *G01N 2030/201* (2013.01)

(58) Field of Classification Search
CPC ........ G01N 30/20; G01N 30/32; G01N 30/36; G01N 2030/021; G01N 2030/027; B01D 15/14
See application file for complete search history.

(56) References Cited

U.S. PATENT DOCUMENTS

| | | |
|---|---|---|
| 4,459,089 A | 7/1984 | Vincent et al. |
| 4,728,434 A | 3/1988 | Trafford |
| 6,793,815 B2 | 9/2004 | Hoffmann |
| 7,396,469 B2 | 7/2008 | Andrews et al. |

(Continued)

FOREIGN PATENT DOCUMENTS

EP     0309596 A1     4/1989

OTHER PUBLICATIONS

Rogatsky, E., et al., "A novel performance test for outlet check valve function in HPLC pumps", American Laboratory. Sep. 28. (Year: 2010).*

*Primary Examiner* — Benjamin L Lebron

(57) ABSTRACT

A fluid supply device for providing a mobile phase for a sample separating device includes, a supply conduit for providing a fluid which forms at least a part of the mobile phase, a fluid valve which is fluidically coupled with the supply conduit and, depending on its switching state, enables or prevents a passing of the fluid from the supply conduit, an elastic buffer unit which is fluidically coupled upstream of the fluid valve with the supply conduit and which is configured for buffering the fluid, and a fluid conveying unit for conveying the fluid which passes the fluid valve.

3 Claims, 4 Drawing Sheets

(56) References Cited

U.S. PATENT DOCUMENTS

| | | |
|---|---|---|
| 7,670,480 B2 | 3/2010 | Witt et al. |
| 8,182,236 B2 | 5/2012 | Shaimi |
| 8,640,730 B2 | 2/2014 | Gerhardt et al. |
| 9,234,630 B2 | 1/2016 | Fuhr et al. |
| 9,310,342 B2 | 4/2016 | Sakai et al. |
| 9,782,692 B2 | 10/2017 | Witt et al. |
| 10,408,747 B2 | 9/2019 | Schlueter et al. |
| 2019/0070571 A1* | 3/2019 | Jackson ................ B01F 33/30 |

* cited by examiner

FLUID SUPPLY DEVICES AND FLUID MEMBER FOR FORMING A MOBILE PHASE FOR A SAMPLE SEPARATING DEVICE

RELATED APPLICATIONS

This application claims priority under 35 U.S.C. § 119(a) to German Patent Application No. DE 10 2020 115 737.1, filed Jun. 15, 2020, the entire contents of which are incorporated by reference herein.

TECHNICAL FIELD

The present invention relates to fluid supply devices for providing a mobile phase for a sample separating device, a fluid member for combining and mixing fluids for forming a mobile phase in a fluid supply device and a sample separating device.

BACKGROUND

In high-performance liquid chromatography (HPLC), typically a liquid (mobile phase) at a very precisely controlled flow rate (for example in a range of microliters to milliliters per minute) and at a high pressure (typically 20 to 1000 bar and above, presently up to 2000 bar), at which the compressibility of the liquid may be noticeable, is moved through a so-called stationary phase (for example in a chromatographic column), to separate single fractions of a sample liquid from each other which is introduced in the mobile phase. After passing the stationary phase, the separated fractions of the fluidic sample are detected in a detector. Such a HPLC-system is for example known from EP 0,309,596 B1 of the same applicant, Agilent technologies, Inc.

For liquid chromatography and other applications of sample separation, it is required to form a mixture of different fluids, for example different solvents, to generate a mobile phase. The mixed fluid composition made of these fluids should be formed as precisely defined as possible. However, it has turned out that in operation of a fluid supply device for generating a mobile phase, volume errors of the fluids to be mixed may occur.

SUMMARY

It is an object of the invention to generate a mobile phase with a composition which is as precise as possible.

According to an exemplary embodiment of a first aspect of the present invention, a fluid supply device for providing a mobile phase for a sample separating device is provided, wherein the fluid supply device comprises a supply conduit for providing a fluid which forms at least a part of the mobile phase, a fluid valve which is fluidically coupled with the supply conduit and, depending on its switching state, enables or prevents a passing of the fluid from the supply conduit, an elastic buffer unit which is fluidically coupled upstream of the fluid valve with the supply conduit and which is configured for buffering the fluid, and a fluid conveying unit for conveying the fluid which is passing the fluid valve.

According to an exemplary embodiment of a second aspect, an integrally formed fluid member for combining and mixing fluids for forming a mobile phase in a fluid supply device is provided, wherein the integrally formed fluid member comprises a plurality of fluid inlets, wherein at each of the inlets, a respective fluid is suppliable, a fluid combining unit for combining the fluids which are supplied at the fluid inlets, and a mixing unit for mixing the combined fluids and for providing the mixed fluids as mobile phase at a fluid outlet.

According to another exemplary embodiment of the second aspect, a fluid supply device for providing a mobile phase for a sample separating device is provided, wherein the fluid supply device comprises a plurality of supply conduits, wherein each of which is configured for providing a respective fluid which commonly form the mobile phase, a plurality of fluid valves, wherein each of which is fluidically coupled with a respective one of the supply conduits, and wherein each of which, depending on its switching state, enables or prevents a passing of the respective fluid from the respective supply conduit, an integrally formed fluid member with the above described features, whose fluid inlets are coupled with the fluid valves and at whose fluid outlet the mobile phase is provided, and a fluid conveying unit which is fluidically coupled with the fluid outlet for conveying the mobile phase.

According to an exemplary embodiment of a third aspect, a fluid supply device for providing a mobile phase for a sample separating device is provided, wherein the fluid supply device comprises a plurality of supply conduits, wherein each of which is configured for providing a respective fluid which commonly form the mobile phase, a plurality of fluid valves, wherein each of which is fluidically coupled with a respective one of the supply conduits, and wherein each of which, depending on its switching state, enables or prevents a passing of the respective fluid from the respective supply conduit, a fluid combining unit for combining the fluids which are passing the fluid valves at a combining position for forming the mobile phase, and a fluid conveying unit which is fluidically coupled with the combining position, for conveying the mobile phase, wherein between the fluid valves and the combining position, a such dimensioned compensating volume is formed, that even in the case of a maximum fluid reflow from the fluid conveying unit in the direction of the fluid valves, reaching the fluid valves by the fluid reflow is made impossible due to the compensating volume.

According to another exemplary embodiment, a sample separating device for separating a fluidic sample is provided, wherein the sample separating device comprises a fluid supply device with the features described above with reference to the first, second and third aspect for providing a mobile phase, in which the fluidic sample is to be injected, and a sample separating unit which is configured for separating the fluidic sample which is injected in the mobile phase (for example into fractions).

In the context of the present application, the term "fluid supply device" may denote an arrangement which may provide a mobile phase in form of a solvent or a solvent composition of a high accuracy and preferably is able to bring it to an elevated pressure. Such a mobile phase may be a fluid, i.e. a liquid and/or a gas, optionally comprising solid particles.

In the context of the present application, the term "sample separating device" may in particular denote a device which is capable and configured to separate a fluidic sample into different fractions. For example, the sample separation may be performed by chromatography or electrophoresis.

In the context of the present application, the term "fluidic sample" may in particular denote a medium which contains the matter which is actually to be analyzed (for example a biological sample, such as a protein solution, a pharmaceutical sample, etc.).

In the context of the present application, the term "mobile phase" may in particular denote a fluid (in particular a liquid) which serves as a carrier medium for transporting the fluidic sample from the fluid drive and the fluid supply unit, respectively, to the sample separating unit. For example, the mobile phase may be a (for example organic and/or inorganic) solvent or a solvent composition (for example water and ethanol).

In the context of the present application, the term "elastic buffer unit for buffering a fluid" may in particular denote a fluid member which is fluidically connectable to a supply conduit, namely before reaching a fluid valve. Such an elastic buffer unit may be configured to provide a variable and hydraulic and pneumatic, respectively, compensation possibility to a fluid which is delivered through the supply conduit. Such a buffer unit may in particular elastically and thus reversibly increase its inner volume in case of a pressure increase and decrease it in case of a pressure reduction. Thus, an elastic buffer unit may provide a fluidic buffer volume for compensating pressure fluctuations and may thus attenuate pressure pulses in a damping manner.

In the context of the present application, the term "fluid conveying unit" may in particular denote a unit for conveying and moving a fluid, which is optionally capable to bring the fluid to an elevated pressure. For example, such a fluid conveying unit may be a pump, for example a single-stage or multi-stage piston pump.

In the context of the present application, the term "integrally formed fluid member" may denote a single integral body in which multiple fluidic functions are integrated. Such an integrally formed fluid member may thus be handled as only one member by a user. In particular, an integrally formed fluid member may be configured such that it cannot be dissembled into single parts without destruction.

In the context of the present application, the term "fluid combining unit" may in particular denote a measure for combining multiple fluidic single flows to a common fluid flow. For example, this may be realized by a fluidic T-piece, a fluidic Y-piece, a fluidic X-piece, etc. The single flows may thus be combined with each other in the fluid combining unit at a combining position to a common flow.

In the context of the present application, the term "mixing unit" may in particular denote a structure for mixing different fluids, i.e. for increasing the homogeneity of the fluid mixture. In particular, such a mechanism may be purely passive, i.e. may operate without movable parts. For example, fluidic obstacles in a fluid conduit and/or different fluid length paths which are passed by different fluid portions, may form part of such a mixing unit. Alternatively or additionally, such a mechanism may be active and may comprise movable parts for driving and mixing the fluid (for example a movable membrane), piezo elements, etc.

In the context of the present application, the term "such dimensioned compensating volume which even in case of a maximum fluid reflow from a fluid conveying unit in the direction of fluid valves makes impossible to reach the fluid valves by the fluid reflow" may denote a sufficiently large inner volume of fluid conduits between the fluid valves and the fluid conveying unit, which, for example in the case of switching inlet and/or outlet valves of the fluid conveying unit, etc., may artificially temporarily accommodate and buffer, respectively, reflowing fluid, and which is dimensioned such that reflowing of this fluid up to the fluid valves is impossible. A maximum occurring fluid reflow is defined by the configuration and dimensions and by the operation control of the fluid supply device. The inner volumes of the fluid conduits between the fluid valves and a combining position of the single fluids form a compensating volume which is dimensioned for safely preventing the reflow of fluid up to the fluid valves, namely even under worst case conditions.

According to an exemplary embodiment of the first aspect of the invention, by implementing at least one elastic buffer unit in a supply conduit in the flow direction in front of the fluid valve, it may be achieved that undesiredly occurring artificial pressure pulses or pressure fluctuations are damped, suppressed and balanced, respectively, still before reaching the fluid valve and thus upstream of the conveyance of the fluid by the fluid conveying unit. Undesired effects on the accuracy of the flow rate or a solvent composition may thus be reliably prevented. The elasticity of the buffer unit enables an increase of its inner volume in the case of a temporarily increased pressure, respectively a reduction of its inner volume in the case of a temporarily decreased pressure. The damping and compensating effect of the buffer unit thus increases the correctness of the composition of the provided mobile phase.

According to an exemplary embodiment of the second aspect of the invention, an integrally formed fluid member for providing multiple fluidic functions for an implementation in a fluid supply device may be provided. Such a fluid member may be handled as an integrally formed member as a whole by a user in a simple manner and may be manufactured in a compact way. Such a fluid member synergistically enables in a space-saving and simple manner a combining of multiple fluid flows and a homogeneously mixing of the same. In this way, missing volumes can be efficiently suppressed.

According to an exemplary embodiment of the third aspect of the invention, upstream of multiple fluid valves and upstream of a combining position at which multiple fluid flows which are coming from the fluid valves are combined, a sufficiently large provided compensating volume may be provided, for example in form of an inner volume of the single fluid conduits. The dimension of this compensating volume is advantageously such that even in the worst case of a maximum fluid reflow with respect to the design of the fluid supply device from the fluid supply unit towards the fluid valves, this parasitic reflow can never reach the fluid valves, but instead is buffered in the compensating volume temporarily and until continuing the forward conveyance by the fluid conveying unit. In this way, it may be reliably prevented that the solvent crystallizes in an undesired manner at valve seals of the fluid valves. Thereby, an undesired spreading of solvent components and thus an un-correct composition of a mobile phase may be reliably avoided. Simultaneously, also the lifetime of the fluid valves may be increased by reducing an abrasion of the valve seals.

In the following, additional embodiments of the fluid supply devices, the fluid member, and the sample separating device are described. Further advantageous embodiments of the first, the second and the third aspect of the invention are commonly described. However, it should be noted that all of these embodiments may be arbitrarily combined with each other, i.e. embodiments of the first aspect of the invention may be also applied to the second and/or third aspect of the invention, and embodiments of the second aspect of the invention may also be applied to the first and/or the third aspect of the invention. Embodiments of the third aspect of the invention may also be applied to the first and/or second aspect of the invention.

According to an embodiment, at least one further supply conduit for providing at least one further fluid which forms at least a further part of the mobile phase, at least one further fluid valve which is fluidically coupled with the at least one further supply conduit and which, depending on its switching state, enables or prevents a passing of the at least one further fluid from the at least one further supply conduit, and at least one further elastic buffer unit are provided, which is fluidically coupled upstream of the at least one further fluid valve with the at least one further supply conduit and which is configured for buffering the at least one further fluid, wherein the fluid conveying unit is configured for conveying the at least one further fluid which passes the at least one further fluid valve, wherein thereby the mobile phase is formed from the fluid and from the at least one further fluid. In other words, elastic buffer volumes may be implemented in each of multiple fluid conduits before reaching the respective fluid valve, wherein thereby pressure artifacts may be suppressed and thus the correctness of the solvent composition may be improved.

According to an embodiment, the buffer unit may comprise a buffer volume and an elastic compensating element which is at least partially delimiting the buffer volume, which is configured for elastically compensating pressure fluctuations in the fluid conduit. The buffer volume may be an inner volume of a buffer unit which is configured as separate fluid member. By the elastic compensating element (for example a membrane) which may automatically react to positive and negative pressure fluctuations, the size of the buffer volume may be adapted in a pressure-depending manner. This enables a rapid and precise reaction to pressure changes and thus contributes to the correctness of a solvent composition.

According to an embodiment, the buffer unit may comprise a sensor unit, in particular comprising a sensor membrane, for detecting a sensor information related to the fluid in the fluid conduit. In the buffer unit, also a sensor may be integrated which is able to detect a sensor information which may be used for controlling the sample separating device, the fluid supply device or the buffer unit itself. For example, as sensor information, a deformation of the sensor membrane which may provide the elasticity of the buffer unit may be used.

According to an embodiment, the sensor information may be selected from a group which is consisting of a pressure of fluid in the fluid conduit, a flow rate of fluid in the fluid conduit, a density of fluid in the fluid conduit, and a temperature of fluid in the fluid conduit. The sensor unit may capture one or more of the mentioned or other parameters. This sensor information may serve for precisely controlling the sample separating device, the fluid supply device and/or the buffer unit and may be provided to a control unit for this purpose.

According to an embodiment, the buffer unit may comprise an actor unit (or actuator unit), in particular comprising an actor membrane, for influencing an effect of the buffer unit on the fluid. Thus, the buffer unit may be configured as active buffer unit, whose elastic behavior and whose buffer volume, respectively, may be actively adjusted and changed, respectively, by a corresponding actuation of the actor unit. This enables an active influence on the buffer volume of the elastic buffer unit by a user or by a control unit.

According to an embodiment, the effect on the fluid by the actor unit may be selected from a group which is consisting of a change of the elasticity of the buffer unit between a more rigid and a more flexible configuration, and a force application onto the fluid. By adjusting an elastic membrane of the buffer unit to be more rigid by a corresponding actuation of the actor unit, the fluidic system may be stiffened and may thus be rendered less elastic. By alternatively adjusting the elastic membrane of the buffer unit to be more flexible by a corresponding actuation of the actor unit, the compensating capability of the fluidic system may be enlarged. In this way, the buffer effect of the elastic buffer unit may be adapted to the requirements of the respective application.

According to an embodiment, the buffer unit may comprise a tempering unit for tempering, in particular for heating and/or cooling, the fluid. In this way, heating or cooling the fluid is possible before reaching the fluid valve. A precise temperature adjustment enables a suppression of thermal artifacts and thus contributes to the accuracy of the solvent composition in a positive manner. For example, such a tempering unit may be configured as Peltier element which may be integrated in the buffer unit.

According to an embodiment, the buffer unit may comprise an electroactive polymer, in particular configured as at least a part of a sensor unit and/or an actor unit of the buffer unit. Electroactive polymer may in particular denote a polymer which is able to change its shape by applying an electric voltage (and which is able to generate an electric voltage when changing its shape, respectively). For example, an elastic membrane of the buffer unit may be formed by such an electroactive polymer or may comprise such an electroactive polymer. Such an electroactive polymer may in particular function as an actor and/or a sensor in the buffer unit. Examples for electroactive polymers are ionic electroactive polymers and electronic electroactive polymers. Ionic electroactive polymers may be electrically conductive polymers, ionic metal-polymer-composites, and ionic gels, for example. As electronic electroactive polymers, for example electrostrictive and ferroelectric polymers and dielectric elastomers may be utilized in the buffer unit. Advantages of electroactive polymers compared to piezo electric ceramics are the achievable high elongations and the low density of the polymers and its free moldability.

According to an embodiment, the buffer unit may be actively controllable by a control unit. In other words, by predetermining a (for example electric) control signal by a user and/or by a processor, a configuration of the buffer unit may be actively predetermined. In this way, a precise and freely changeable adjustment of the properties of the buffer unit (for example of its elasticity and/or of its influence on the size of the inner volume of the buffer unit) is possible. The buffer unit may thus be actively adapted to the requirements of a special application.

According to an embodiment, the integrally formed fluid member may be configured as a stiff body with fluid channels. Such a stiff body is simply handleable, manufacturable with low effort and robust in operation. The fluid channels in the stiff body may extend originating from the fluid inlets, via a combining position where the fluids combine, and then through the mixing unit up to the fluid outlet.

According to an embodiment, the fluid member may be shaped as a plate and/or may be configured as an injection molded part or a laminate. A manufacture as injection molded part enables the provision of the integrally formed fluid member with low effort. Alternatively, a manufacture of the stiff body as metallic laminate or plastic laminate is possible, i.e. a manufacture by pressing structured metal- or plastic-layers by pressure and/or temperature.

According to an embodiment, the fluid combining unit may comprise inlet channels which are fluidically coupled with the fluidic inlets, which are combined at a combining position to a single outlet channel which leads to the mixing unit. Advantageously, all of the single inlet channels may comprise the same inner volume. Thus, combining multiple fluid flows in a symmetric and guided manner for forming a mobile phase with a precise predeterminable composition is enabled.

According to an embodiment, the inlet channels and the combining position may form a substantially X-shaped fluidic structure (see FIG. 2). The inlet channels may be formed by the four legs and the combining position may be formed by the center of the X-shaped fluidic structure. It is also possible to provide an arrangement of multiple (for example substantially X-shaped) introducing structures. By an X-shaped introducing structure, fluids from four channels may be combined. If another number of channels and/or fluids to be combined shall be implemented, the introducing structures may also be formed with another shape, for example as Y-shaped introducing structure, when three fluids merge. Thus, according to other embodiments, introducing structures for combining at least two, in particular three, four, five, or more fluids may be provided.

According to an embodiment, the mixing unit may be configured for splitting the combined fluids into multiple separate fluid streams in different mixing channels and for recombining the fluid streams in the mixing channels to the mixed mobile phase. By such a purely passive mixing unit, movable parts can be avoided and nevertheless an effective mixing of the single fluids may be achieved. This enables a simple manufacture and an error-robust operation of the mixing unit.

According to an embodiment, the different mixing channels may be configured to predetermine different flow times for the different fluid streams. Different flow times in the different mixing channels may be achieved by different fluid length paths, different inner diameters and/or different fluidic restrictions (for example by implementing fluidic obstacles for redirecting and/or whirling the fluid flow) in the single mixing channels, for example. In particular, such a passive mixing unit may be configured as cross-connected fluidic meander structure.

According to an embodiment, the mixing unit may be configured as an elongated structure. The longer the mixing unit is configured, the longer the mixing channels in their interior may be configured. Longer mixing channels, in particular in combination with very short mixing channels, promote an especially effective mixing of the single fluids.

According to an embodiment, the fluid member may comprise a sensor unit for detecting a sensor information which is related to the single fluids and/or the mobile phase. In the fluid member, also a sensor may be integrated which can detect a sensor information which may be used for controlling the sample separating device, the fluid supply device, or the fluid member itself. For example, an inner pressure in the fluid member may be used as sensor information.

According to an embodiment, the sensor information may be selected from a group which is consisting of a pressure of the single fluids and/or the mobile phase, a flow rate of the single fluids and/or the mobile phase, and a temperature of the single fluids and/or the mobile phase. The sensor unit may capture one or more of the mentioned or other parameters. This sensor information may serve for precisely controlling the sample separating device, the fluid supply device and/or the fluid member.

According to an embodiment, the fluid member may comprise a tempering unit for tempering, in particular for heating and/or cooling, the single fluids and/or the mobile phase. In this way, heating or cooling the fluids still before reaching the fluid conveying unit is possible. A precise temperature adjustment enables a suppression of thermal artifacts and thus contributes to the accuracy of a solvent composition in a positive manner. For example, such a tempering unit may be configured as a Peltier element which is integrated in the fluid member.

According to an embodiment, the integrally formed fluid member may be made of one material. Thus, the member may be manufactured from a single homogenous material, for example as injection molded part or as laminate made of plastic. This enables uniform physical properties (in particular heat expansion) and enables a simple manufacture.

According to an embodiment, the fluid combining unit may be configured for splitting each of the fluids which are supplied at a respective one of the fluid inlets into multiple respective partial channels. Furthermore, at each of a plurality of combining positions, the fluid combining unit may recombine the partial channels which are assigned to different ones of the fluids. Thereby, at each of the combining positions, a respective combined flow of the different fluids may be obtained. Subsequently, the fluid combining unit may supply the flows which are combined at the combining positions to the mixing unit for mixing. Thus, also multiple combining positions may be provided which may respectively combine partial flows of the single fluids which were previously split, and may subsequently provide it to the mixing unit for mixing. In this way, the combination and the subsequent mixture may be performed in an error-robust manner, even when one of the combining positions is blocked or fails due to another reason. In this case, via the other combining position(s), a provision of fluids can be maintained which may be subsequently mixed. A corresponding configuration is illustrated in FIG. 10.

According to an embodiment, the fluid combining unit may comprise inlet channels between the fluid valves and the combining position, whose common inner volume prevents the compensating volume for preventing a reflow of the mobile phase from the fluid conveying unit up into the fluid valves. Since dimensioning such fluid channels is possible with a high precision, also the compensating volume may be predetermined in a simple and precise manner, to reliably protect the fluid valves, even in the case of a maximum fluid reflow from the fluid conveying unit backwards.

According to an embodiment, the compensating volume may be at least 5 μL, in particular at least 10 μL, further in particular at least 30 μL. For piston pumps which are utilized in chromatography, these volumes have turned out as being suitable to prevent an undesired pump reflow into the fluid valves.

According to an embodiment, the fluid supply device may comprise a plurality of supply conduits which are fluidically coupled with a respective fluid valve, and wherein each of which is fluidically coupled with a respective one of a plurality of fluid component sources for providing a respective fluid of which the mobile phase is formed. In this way, by arranging a proportioning unit (which contains the single fluid valves) downstream of the multiple supply conduits, a sequence of serially arranged fluid packages with different solvents may be obtained (for example water, an organic solvent, such as methanol or acetonitrile, etc.). In each switching operation of the fluid valves of the proportioning unit, a solvent component of the mobile phase may pass this proportioning unit. By subsequently actively switching the single supply conduits by the fluid valves, a sequence of solvent components may occur which may be processed by diffusion, actively mixing, and/or compression in the fluid conveying unit to a homogenous mobile phase.

According to an embodiment, the fluid supply device may comprise a combining position, at which the fluid packages made of the fluid component sources are combined for forming the mobile phase. In the context of the present invention, the term "packages of fluids" in particular denotes a temporal and spatial sequence of sections of subsequently and sequentially, respectively, flowing fluids in a fluid conduit. These sections may be different with respect to the substance of the respective fluid package. For example, a proportioning unit may alternatingly fluidically couple a conduit which is conducting the solvent composition with different supply conduits, wherein from a respective supply conduit, a respective fluid package is coupled into the conduit and conveyed. Thus, a sequence of at first weakly mixed and separate fluid packages results which may then be mixed. At the fluidic combining position, the fluid packages from the fluid component sources merge. Thereby, the mobile phase with the desired composition is obtained, which may be adjusted by the opening intervals of the fluid valve(s) with respect to the respective supply conduits. The combining position may be configured as fluidic T-position, fluidic Y-position, fluidic X-position, etc., for example.

According to an embodiment, the fluid valves may be configured as proportioning units for proportioning the fluid packages of the respective fluids which are supplied by the supply conduits. As already described, by switching the proportioning units such that from the single supply conduits with the single solvent components, respectively fluid packages of certain lengths may be supplied, each desired solvent composition of the mobile phase may be adjusted. Referring to a chromatographic gradient run, the solvent composition may be changed over time, to release a fluidic sample which is adsorbed at a chromatographic separating column in fractions, namely separatedly for each fraction at a certain solvent composition. However, it is also possible to remain the solvent composition constant over time, for example in an isocratic chromatographic separating mode.

According to an embodiment, the fluid valves may be commonly configured as multichannel gradient valve. For example, the fluid valves may form a four-channel gradient valve, i.e. may be configured as a quaternary valve.

According to an embodiment, a respective fluid valve may be a bidirectional fluid valve, which in particular may be configured as an active bidirectional fluid valve or passive unidirectional fluid valve. The at least one fluid valve may be in particular an active or passive inlet valve. It may be arranged in particular upstream of the fluid conveying unit.

According to an embodiment, the fluid conveying unit may be configured for drawing the mobile phase. For example, the fluid conveying unit may comprise a piston pump or a plurality of serial or parallel piston pumps, in particular a double piston pump. In particular, the fluid conveying unit may be selected from a group which is consisting of a binary pump, a quaternary pump, and a multichannel pump. For example, the fluid conveying unit may comprise a primary piston pump and a secondary piston pump which is arranged downstream. The primary piston pump may retract its piston to draw mobile phase from the at least one fluid valve and to transfer it into its piston chamber. Subsequently, the primary piston pump may compress the mobile phase by a forward motion of the piston. The compressed mobile phase may be transferred from the primary pump into the secondary pump by a combined retraction of the piston of the primary piston pump and a simultaneous forward motion of the piston of the secondary pump. Subsequently, the secondary piston pump may convey the already pre-compressed mobile phase by the forward motion of its piston into a separating path, i.e. towards a sample separating unit (for example a chromatography column). However, it should be noted that alternative fluid conveying units are possible, for example two piston pumps which are not connected in series, but in parallel, or a single piston pump. Also other pump types may be utilized, for example a peristaltic pump.

According to an embodiment, the fluid conveying unit may be configured for conveying the mobile phase with a pressure of at least 500 bar, in particular at least 1200 bar. In other words, the fluid conveying unit may be a high pressure pump. In other words, the fluid conveying unit may provide high and highest pressures as it is desired for the requirements of a liquid chromatography sample separating device, in particular a HPLC, for example. At the mentioned high pressures, already small volume errors of the mobile phase may lead to significant influences on a separating result.

According to an embodiment, the fluid whose constituents shall be mixed, may be a mobile phase, into which the fluidic sample to be separated is to be introduced during (in particular chromatographic) sample separating. Such a mobile phase may be in particular a solvent or a constant or variable solvent composition which co-conveys the fluidic sample which is actually to be separated along the fluid conduits of the sample separating device. In a chromatographic separating experiment, in a gradient operation, after adsorbing fractions of the fluidic sample at a stationary phase of a sample separating unit, the mobile phase may release the fractions from the sample separating unit (such as a chromatographic separating column) in fractions, by successively changing the solvent composition of the mobile phase, for example. Alternatively, also an isocratic mode is possible, for example, wherein the solvent composition may remain constant over time. The exact composition of the mobile phase has an influence on the flow rate and a conveyed fluid volume amount, respectively. This influence in turn influences the accuracy of the separating result, in particular the position and the amplitude (in particular height) of peaks in a chromatogram. By increasing the exactness of the composition of the mobile phase, more comparable separating data may be obtained and the separating result (for example a chromatogram in a chromatographic separating method) may be rendered more precise.

According to an embodiment, between a plurality of fluid component sources and the fluid conveying unit, a degasser may be arranged. A degasser may remove gas which is contained in the solvents which are conveyed from the single fluid component sources (in particular solvent containers) through the fluid conveying unit from the assigned liquid. Such gas bubbles in a liquid solvent may impair the accuracy of a fluid composition. For example, such a degasser may fluidically couple the solvent to be conveyed with an exchange medium through a permeable membrane, such that gas bubbles in the liquid solvent diffuse into the exchange medium.

According to an embodiment, the mobile phase and composition, respectively, may comprise at least a first solvent, in particular water, and a second solvent, in particular an organic solvent.

The sample separating device may be a microfluidic measuring device, a life science device, a liquid chromatography device, a high-performance liquid chromatography (HPLC) device, an ultra-high performance liquid chromatography (UHPLC)-device, or a supercritical liquid chromatography (SFC) device. However, many other applications are possible.

According to an embodiment, the sample separating device may be configured as a chromatographic separating unit, in particular as a chromatography separating column. In a chromatographic separation, the chromatography separating column may be provided with an adsorption medium. The fluidic sample may be held there and may be subsequently released in fractions not before a specific solvent composition is present, whereby the separation of the sample into its fractions is accomplished.

For example, the pumping system may be adapted to deliver the fluid and the mobile phase, respectively, through the system with a high pressure, for example some 100 bar up to 1000 bar or more.

The sample separating device may comprise a sample injector for introducing the sample into the fluidic separating path. Such a sample injector may comprise an injection needle in a corresponding liquid path, which is coupleable with a seat, wherein the needle may be moved out of the seat to receive the sample, wherein after re-inserting the needle into the seat, the sample is located in a fluid path which, for example by switching a valve, may be connected to the separating path of the system, which results in an introduction of the sample into the fluidic separating path.

The sample separating device may comprise a fraction collector for collecting the separated components. Such a fraction collector may lead the different components of the separated sample into different liquid containers, for example. However, the analyzed sample may also be supplied to a drain container.

Preferably, the sample separating device may comprise a detector for a detection of the separated components. Such a detector may generate a signal which may be observed and/or recorded and which is indicative for the presence and amount of the sample components in the fluid that is flowing through the system.

BRIEF DESCRIPTION OF THE DRAWING FIGURES

Other objects and many of the accompanying advantages of embodiments of the present invention are easier to recognize and better to understand with reference to the following detailed description of embodiments in conjunction with the accompanying drawings. Features which are substantially or functionally the same or similar, are provided with the same reference signs.

Figure 1:
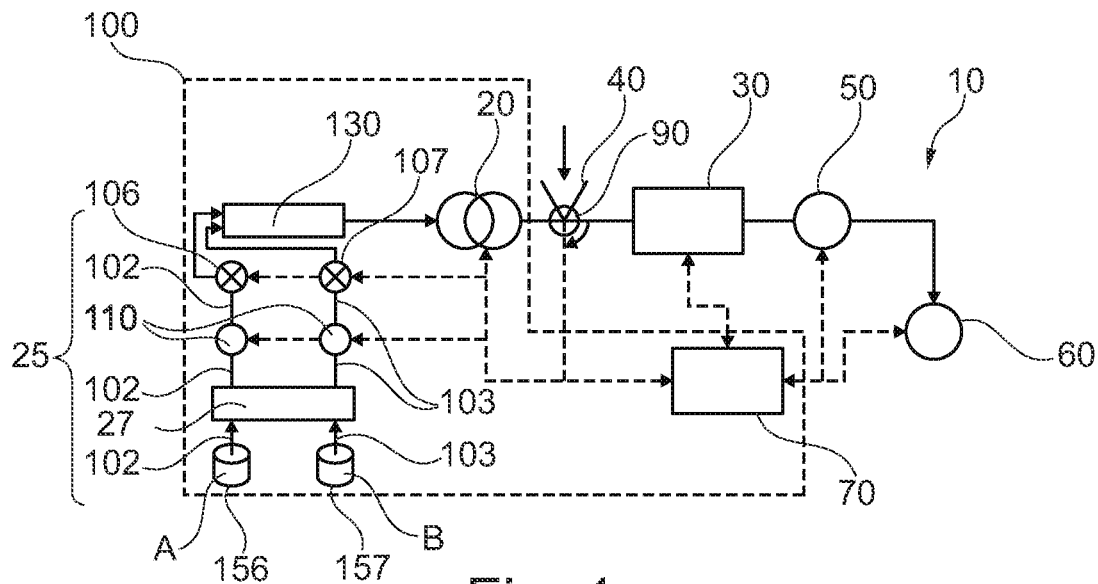
FIG. 1 shows a HPLC-system with a fluid supply device according to an exemplary embodiment of the invention.

The illustration in the drawing is schematic.

DETAILED DESCRIPTION

Before referring to the drawing figures exemplary embodiments are described, some basic considerations shall be summarized, based on which exemplary embodiments of the invention have been derived.

According to a first aspect of an embodiment of the invention, in fluid connection with a supply conduit and still in front of a fluid valve, an elastic buffer unit may be implemented, which, as fluidic capacity, may have a damping and compensating effect, respectively. Such a buffer between a solvent bottle and the inlet valve enables precise inlet volumes. An active buffer, for example configured by an electroactive polymer, enables a precise determination and specification, respectively, of the volume stream. Such a preferably active elastic buffer unit may advantageously comprise a sensor (in particular for capturing the pumping pressure, the density of a mobile phase, etc.) and/or an actor or actuator (in particular for adjusting the stiffness of the buffer unit). Such a sensor may be configured as a sensor membrane, for example. Such an actor may be configured as an actor membrane, for example. By providing a buffer unit with flexible and reliably adjustable, respectively, inner volume per supply conduit, solvent containers may be brought in close vicinity to a pump, such that a distance between the solvent container and the solvent inlet may be shortened. This improves the introducing behavior and prevents an undesired delay in the solvent supply which may conventionally lead to an undesired deviation of an actual composition of a mobile phase from a target composition.

According to a second aspect of an embodiment of the invention, a fluid member which is configured in an integrally formed manner or made of one piece, may accomplish both, combining multiple fluid flows and mixing. By such a member combination of a manifold with a mixer to a preferably stiff member, undesired missing volumes may be reliably prevented. Thus, in an advantageous manner, a space-saving integration of an entire multichannel gradient valve into a physical unit may be accomplished. In particular, in this respect, a use of a liquid crystal polymer (LCP) may be advantageous. For example, a mixer with an integrated distributor and passive damping may be provided.

According to a third aspect of an embodiment of the invention, a reflow volume between fluid valves and a fluid conveying unit of a fluid supply device may be provided, to receive mixed solvent which is pushed out of the pump in the backward direction before the inlet valve can close. Descriptively, a sufficiently large compensating volume may be implemented for the protection from a pump reflow.

Conventionally, a position where a gradient valve combines different solvents may be arranged in a separate member of the gradient valve. This leads to a high complexity and to a construction which is prone to errors and elaborate. Conventionally, the distributor may be integrated in a valve block and separated from the mixer which is a further assembly. In this way, problems in the connection of the different assemblies arise. Such a conventional valve block has to be precisely manufactured with small tolerances, which increases the manufacturing effort and the risks for an erroneous operation. Since a conventional design of a sealing position (in particular a valve) may receive too little volume up to combining the different channels (manifold position), an undesired reflow of the pump may lead to a failure of the valve. The mixed solvent is removed behind a seal position, which may trigger undesired chemical reactions. For example, conventionally, salt crystals may form which block the valve, or a polymerization may occur, whereby the valve may adhere. The mixer has to be connected via fluidic connection elements, which increases both, the effort and the risk for errors. A further problem of conventional fluid supply devices is that the entire liquid from solvent containers has to be accelerated along a long fluidic path up to a mixer, which has an adverse effect on the performance and promotes undesired pressure waves. The latter is disadvantageous for the performance of the valve.

According to an exemplary embodiment of the invention, the mixer and the element which combines the (for example four) fluid channels may be combined in a common member. This integrally formed member may be a planar structure or micro-processed or structured polymer foils (for example made of liquid crystal polymer), for example. Additionally, for improving the performance, an intelligent damper in form of a fluidic capacity and in form of an elastic buffer element, respectively, may be placed in front of a multichannel gradient valve.

According to an embodiment of the invention, a simplified assembly may thus be provided and a protection volume for each fluid channel may be provided. Additionally, an active damper may decouple the multichannel gradient valve from a solvent conduit with respect to excitations and mass inertia, which suppresses pressure pulses and improves the performance of the multichannel gradient valve compared to conventional embodiments.

An integrally formed fluid member for a fluid supply device according to an exemplary embodiment of the invention may provide (for example four) defined inlets from the multichannel gradient valve and a protection volume which may be dimensioned larger than or equal to a maximum reflow of the pump and all actors between a distributor position and the pump inlet. This means that an undefined composition cannot be rinsed beyond the seal position of the valve, whereby an undesired crystallization and a failure of the valve may be reliably avoided. Since the volume of the distributor is fixed and the tubes or fluid ports in the integrally formed member are dispensable, heating devices, cooling devices, temperature sensors, sensors (for example flow sensors and/or pressure sensors) for measuring defined solvent attributes may be utilized.

Since exemplary embodiments of the invention enable large diameters of the hydraulic conduits, tolerances or roughness have less impact on the pump performance. In order to accelerate a suction operation of the mobile phase through a fluid conveying unit and to decouple from the solvent conduit of the solvent containers, advantageously elastic buffer units which are configured as hydraulic capacities decouple the solvent containers and their fluid conduits from the rest of the system. During a fast reception, the liquid is mainly delivered from the capacity. Thus, it is dispensable to accelerate the rest of the fluid conduit. An elastic buffer unit which is configured as fluidic capacity may be made of a fluid reception volume which may be sealed with an elastic membrane (for example made of a perfluoro-elastomer or perfluorinated rubber (FFKM) or silicone) with a sensor layer. A sensor layer of such an elastic buffer unit may be manufactured as strain gauge or from a dielectric silicone or polymer, for example. This enables a measurement of the pressure drop, when a defined fluid reception is performed by the pump, for example. When the elasticity of the membrane and the bending are known, a pressure drop, pressure peaks, pressure waves or even a blocking of filters may be avoided. When using an electro-active polymer, for example made of silicone, the sensor element may also be configured as an actor. In particular, thereby, a bias of the damper may be dynamically adjusted.

Exemplary embodiments of the invention may provide fluid supply devices for a multichannel gradient valve which may be an inlet valve arrangement in front of a chromatographic pump for generating a solvent mixture. In particular, in each fluid channel from a respective solvent bottle to a switching valve for this fluid channel, a fluidic buffer unit may be implemented. Such a buffer volume may serve for overcoming limitations which are resulting from the fact that fluidic restrictions are unavoidable in the supply conduit from the solvent container to the valve. In operation, such restrictions may lead to the fact that the solvent cannot be accelerated in an arbitrarily fast manner, which may lead to a certain delay and thus in particular at small volumes to an erroneous dosing or metering. According to an exemplary embodiment of the invention, this may be avoided by a respective buffer volume in a respective fluid conduit. Such a fluid-elastic buffer unit thus leads to an improvement of the accuracy of the solvent composition. In particular, the buffer unit may be an active buffer in front of a respective switching valve.

FIG. 1 shows the setup of an HPLC-system in principle as example for a liquid chromatography sample separating device 10 according to an exemplary embodiment of the invention, as it may be used for a liquid chromatography, for example. A fluid conveying unit 20 which is supplied with solvents from a supply unit 25 drives a mobile phase through a sample separating unit 30 (such as a chromatographic column, for example) which contains a stationary phase. The supply unit 25 encompasses a first fluid component source 156 for providing a first fluid or a first solvent component A (for example water) and a second fluid component source 157 for providing another second fluid or a second solvent component B (for example an organic solvent). An optional degasser 27 may degas the solvents which are provided by the first fluid component source 156 and by the second fluid component source 157, before these are supplied to the fluid conveying unit 20. A sample application unit 40, which may also be denoted as injector, is arranged between the fluid conveying unit 20 and the sample separating unit 30, to introduce a sample liquid or a fluidic sample into the fluidic separating path. For this purpose, an injector valve 90 may be correspondingly switched. The stationary phase of the sample separating unit 30 is provided for the purpose to separate the components of the sample. A detector 50 which may comprise a flow cell detects separated components of the sample, and a fractionating device 60 may be intended for dispensing the separated components of the sample into containers which are provided for this purpose. Liquids which are no longer required may be dispensed into a drain container or a waste (not shown).

While a liquid path between the fluid conveying unit 20 and the sample separating unit 30 is typically under high pressure, the sample liquid under normal pressure is at first introduced in a region which is separated from the liquid path, a so-called sample loop of the sample application unit 40 or of the injector, which in turn introduces the sample liquid into the liquid path under high pressure. While connecting the sample liquid which is at first under normal pressure in the sample loop into the liquid path under high pressure, the content of the sample loop is brought to the system pressure of the sample separating device 10 which is configured as HPLC. A control unit 70 controls the single members 20, 30, 40, 50, 60, 90 and the fluid valves 106, 107 which are described in more detail below, and active elastic buffer units 110 of the sample separating device 10.

FIG. 1 also shows a liquid chromatography fluid supply device 100 for providing a mixture of multiple different fluids as solvent composition or mobile phase for the liquid chromatography sample separating device 10. The fluid supply device 100 comprises in the shown embodiment two supply conduits 102, 103, wherein each is fluidically coupled with a respective one of the two solvent containers which are denoted as fluid component sources 156, 157 for providing a respective one of the fluids or solvent components A and B. The respective fluid or the respective solvent component A and/or B is conveyed through the respective supply conduit 102 and/or 103 through the degasser 27 and through a respective elastic buffer unit 110 to a respective fluid valve 106 and/or 107. Behind the fluid valves 106, 107, an integrally formed fluid member 130 is located, at which the fluids or solvent components A and/or B from the supply conduits 102, 103 are combined with each other and are mixed. Behind the fluid valves 106, 107 which are configured as proportioning units, the fluid packages from the supply conduits 102, 103 thus merge under formation of a homogeneously mixed solvent composition. The latter is supplied to the fluid conveying unit 20.

The fluid supply device 100 according to FIG. 1 has numerous advantageous properties: firstly, providing a conduit-specific elastic buffer unit 110 in each of the fluid conduits 102, 103 leads to a damping of pressure fluctuations and/or pressure pulses and thus to a more correct solvent composition. Since each of the buffer units 110 is actively controllable by the control unit 70, the rigidity and/or flexibility of an elastic element of a respective buffer unit 110 may be adjusted in a desired manner. Integrating a fluid combining function for combining the solvents from the fluid conduits 102, 103 and a mixing function of these solvent streams in the integrally formed fluid member 130 leads to a compact configuration and to an error-robust operation. By selecting an inner volume of the integrally formed fluid member 130 to be sufficiently large, even in case of a temporal reflow of mobile phase from the fluid conveying unit 20 back into the fluid member 130, it may be reliably prevented that the mobile phase flows back into the valves 106 and/or 107 and the valve seals are damaged or destroyed by crystallizing the mobile phase. These advantageous properties which all act together for enabling a correct and precise solvent composition are described in more detail below.

Figure 2:
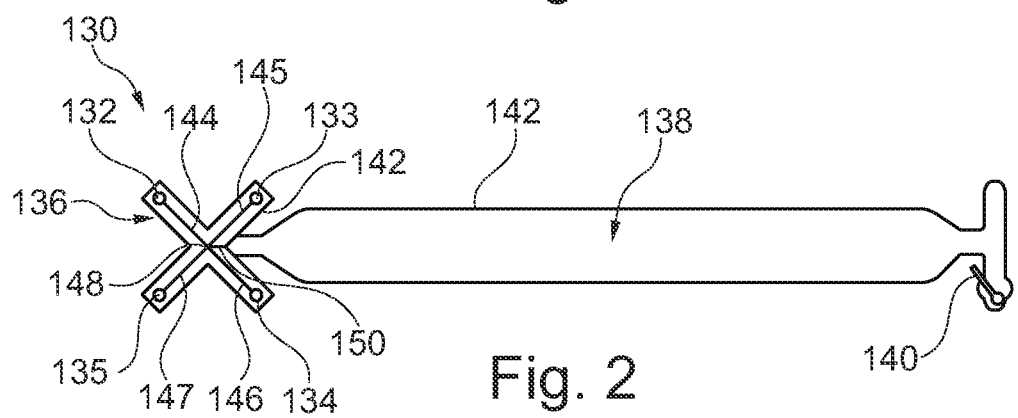
FIG. 2 shows an integrally formed fluid member of a fluid supply device according to an exemplary embodiment of the invention.

FIG. 2 shows an integrally formed fluid member 130, which is configured as a stiff body 142, of a fluid supply device 100 according to an exemplary embodiment of the invention.

The integrally formed fluid member 130 which is illustrated in FIG. 2 fulfills a double function, namely combining and mixing fluids for forming a mobile phase in the fluid supply device 100. For this purpose, the integrally formed fluid member 130 comprises four fluid inlets 132 to 135, wherein at each of the fluid inlets 132 to 135, a respective fluid is suppliable. Each of the fluid inlets 132 to 135 is connectable or connected with a respective one of four fluid valves 106 to 109 which are illustrated in FIG. 4. Furthermore, a fluid combining unit 136 which is substantially X-shaped is provided for combining the fluids which are supplied at the fluid inlets 132 to 135. Moreover, in the interior of the member 130, a mixing unit 138 for mixing the combined fluids and for providing the mixed fluids as mobile phase at a fluid outlet 140 of the fluid member 130 is fluidically connected to the fluid combining unit 136. Said fluid combining unit 136 comprises inlet channels 144 to 147 which are fluidically coupled with the fluid inlets 132 to 135. The inlet channels 144 to 147 are combined at a fluidic combining position 148 to a single outlet channel 150 which leads to the mixing unit 138 for mixing the combined fluids or solvent components. As illustrated in FIG. 2, the inlet channels 144 to 147 and the combining position 148 form a substantially X-shaped fluidic structure. As illustrated schematically in FIG. 2 and in detail in FIG. 3, the mixing unit 138 may be configured as elongated structure.

The fluid member 130 may be configured as a compact stiff body 142 with fluid channels 144 to 147, 150, 152 (see FIG. 3) and may be shaped as a plate and/or configured as an injection molded part or a laminate member. For example, the fluid member 130 may be manufactured from one material made of plastic.

Despite not being shown for the fluid member 130 in the drawing figures, the fluid member 130 may comprise one or more sensor units for detecting a sensor information related to the single fluids and/or the still unmixed or already mixed mobile phase, in a respective one of the inlet channels 144 to 147 and/or at channels (see reference sign 152 in FIG. 3) of the mixing unit 138, for example. For example, by such a sensor unit, a pressure of the single fluids and/or the still unmixed or already mixed mobile phase, a flow rate of the single fluids and/or the still unmixed or already mixed mobile phase, and/or a temperature of the single fluids and/or the still unmixed or already mixed mobile phase may be captured. Also not shown in the drawing figure is that the fluid member 130 may comprise a tempering unit for heating and/or cooling the single fluids and/or the still unmixed or already mixed mobile phase.

Figure 6:
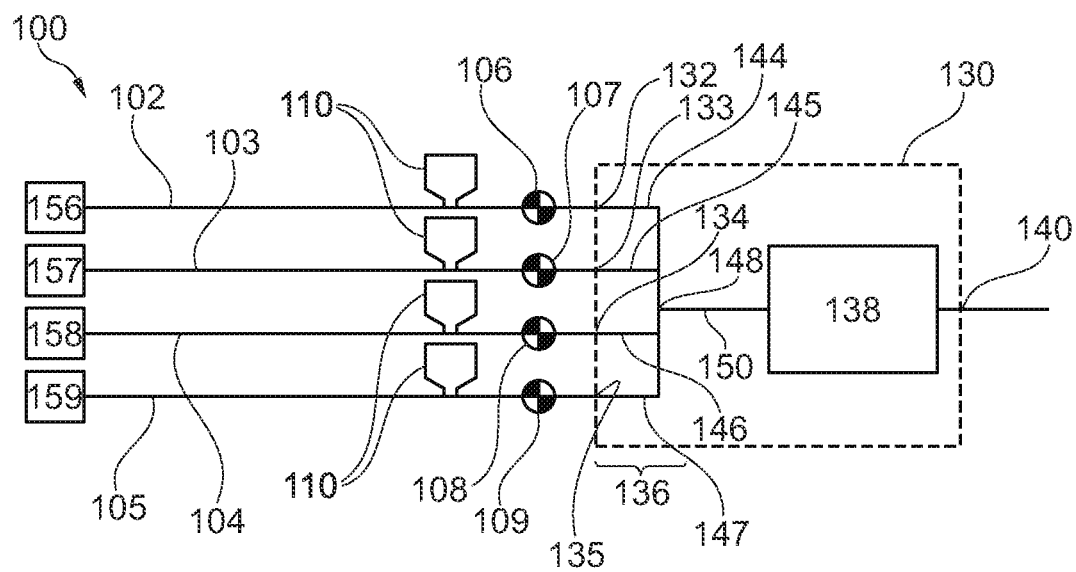
FIG. 6 shows a fluid supply device with buffer units in supply conduits according to still another exemplary embodiment of the invention.

The fluid member 130 which is illustrated in FIG. 2 may be integrated in a fluid supply device 100 for providing a mobile phase for a sample separating device 10 in the manner shown in FIG. 4 or FIG. 6, for example. For this purpose, the fluid inlets 132 to 135 of the fluid member 130 may be fluidically connected to outlets of the respective fluid valves 106 to 109. A fluid outlet 140 of the mixing unit 138 of the fluid member 130 may be fluidically connected to an inlet of a fluid conveying unit 20 which is configured as a chromatographic high pressure pump, for example. Thus, at the fluid outlet 140 of the fluid member 130, the correctly composited and already mixed mobile phase is provided for further processing (in particular for compressing and conveying) by the fluid conveying unit 20. For example, the fluid conveying unit 20 may convey the mobile phase with a pressure of at least 1000 bar, for example 1200 bar. For example, the fluid conveying unit 20 may be configured as a piston pump or a plurality of serial or parallel piston pumps, in particular as double piston pump.

Figure 3:
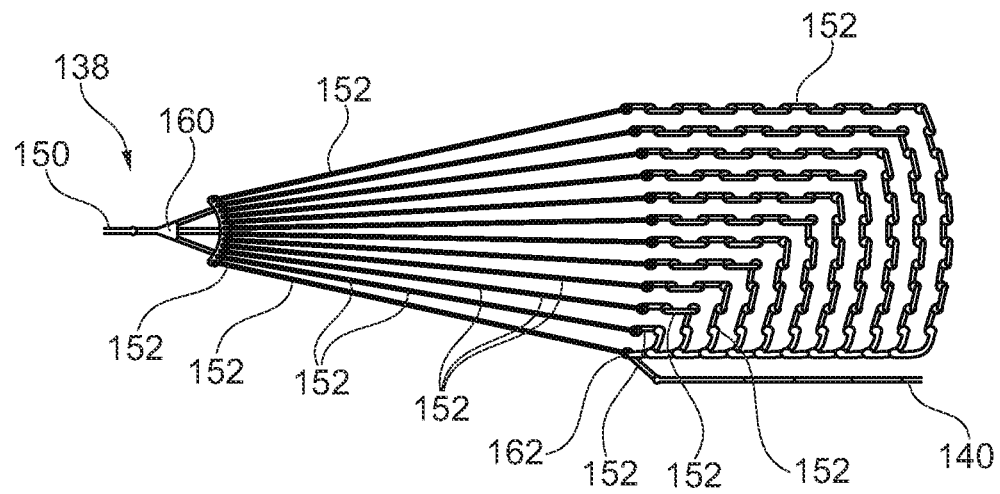
FIG. 3 shows an integrated mixing unit of the integrally formed fluid member according to FIG. 2.
Figure 4:
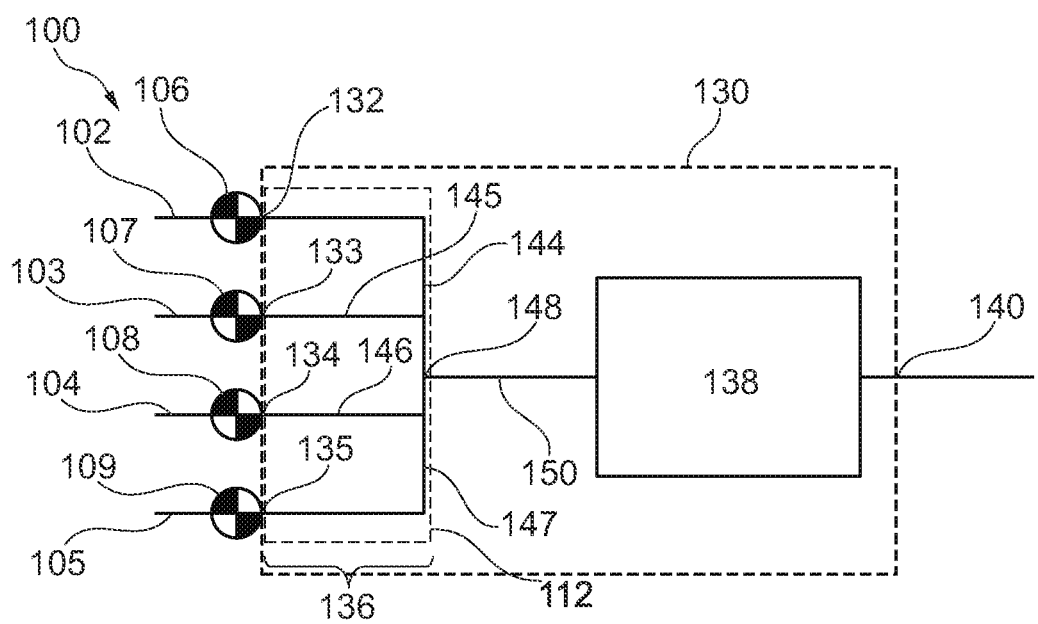
FIG. 4 shows a fluid supply device with a valve protection against pump reflow according to an exemplary embodiment of the invention.

FIG. 3 shows the integrated mixing unit 138 of the integrally formed fluid member 130 according to FIG. 2.

A fluid inlet of the mixing unit 138 corresponds to an outlet channel 150 of the fluid combining unit 136 and/or is fluidically coupled with it. The mixing unit 138 which is illustrated in FIG. 3 is a purely passive and thus error-robust mixer which at first splits the combined fluids into multiple separate fluid streams in different mixing channels 152 and combines the split fluid streams in the mixing channels 152 after passing the same to the mixed mobile phase under combining the single fluid streams. The different mixing channels 152 are configured to predetermine different flow times for the different fluid streams. This is realized according to FIG. 3 by differently long mixing channels 152 between a splitting position 160 and a combining position 162. Alternatively or supplementary, different flow times of the mixing channels 152 may also be accomplished by a variation of their inner diameters, by the implementation of fluidically delayed restrictions in the mixing channels 152, etc. In a sequence of subsequent solvent packages of the different solvents from the inlet channels 144 to 147 corresponding to a sequential switching logic of the fluid valves 106 to 109, the solvent packages may be split into the different mixing channels 152 and may be effectively mixed with each other due to the differently long flow times at the combining position 162.

FIG. 4 shows a fluid supply device 100 according to an exemplary embodiment of the invention.

The fluid supply device 100 according to FIG. 4 shows at first four supply conduits 102 to 105, wherein each of which is configured for providing a respective fluid which commonly form the mobile phase. The single fluids may be solvents which are provided by solvent containers which may be fluidically connected to a respective one of the supply conduits 102 to 105 (compare FIG. 6). Furthermore, four fluid valves 106 to 109 are illustrated, wherein each of which is fluidically coupled with a respective one of the supply conduits 102 to 105. Each of the fluid valves 106 to 109 may be individually controlled, for example opened or closed, by a control unit (see reference sign 70 in FIG. 1). The fluid valves 106 to 109 commonly with the control unit 70 form a proportioning unit for proportioning fluid packages of the different fluids which are supplied by the supply conduits 102 to 105. More precisely, the fluid valves 106 to 109 commonly form a multichannel gradient valve. When the fluid conveying unit 20 draws at the fluid inlets 132 to 135 downstream of the fluid valves 106 to 109, the respective fluid or solvent from one of the supply conduits 102 to 105, whose assigned fluid valve 106 to 109 is presently open, may be sucked into the fluid member 130. In other words, each of the fluid valves 106 to 109, depending on its switching state (for example open or closed), enables passing the respective fluid from the respective supply conduit 102 to 105 or prevents it. When at a certain instant in time, respectively exactly one of the fluid valves 106 to 109 is open, and when at this instant in time, the respective others of the fluid valves 106 to 109 are closed, a sequence of subsequent fluid packages of different solvents (for example water, ethanol, acetonitrile, etc.) flows through the outlet channel 150. The fluid combining unit 136 serves for combining the fluids which are passing the fluid valves 106 to 109 at a combining position 148 for forming the mobile phase. In the mixing unit 138, the fluid packages of the single solvents are mixed to a homogenous mobile phase and are provided to a fluid conveying unit 20 which is fluidically coupled with the fluid outlet 140 for conveying the mobile phase.

Advantageously, between the fluid valves 106 to 109 and the mixing unit 138, a such dimensioned compensating volume 112 in form of the inner volume of the inlet channels 144 to 147 is formed, that even in the case of a maximum fluid reflow from the fluid conveying unit 20 in the direction of the fluid valves 106 to 109, reaching the fluid valves 106 to 109 by the fluid reflow is fluidically made impossible due to the compensating volume 112. In other words, the inner volume of the inlet channels 144 to 146 is selected to be sufficiently large, that even under worst circumstances, a reflow of the mobile phase from the fluid conveying unit 20 into the inlet channels 144 to 147 can never reach up into the fluid valves 106 to 109 due to the described dimensional configuration. Undesired crystallizing of the mobile phase under damage of the seals of the fluid valves 106 to 109 is thereby avoided. More precisely, the fluid combining unit 136 between the fluid valves 106 to 109 and the combining position 148 has elongated inlet channels 144 to 147 whose common inner volume forms the compensating volume 112. Advantageously, the compensating volume 112 is at least 10 μL. Descriptively, the compensating volume 112 is formed by the leg length and the inner diameter of the inlet channels 144 to 147 in the substantially X-shaped structure according to FIG. 2. The compensating volume 112 is at least dimensioned as large as a maximum error volume which is pushed back by the high-pressure pump in operation.

Figure 5:
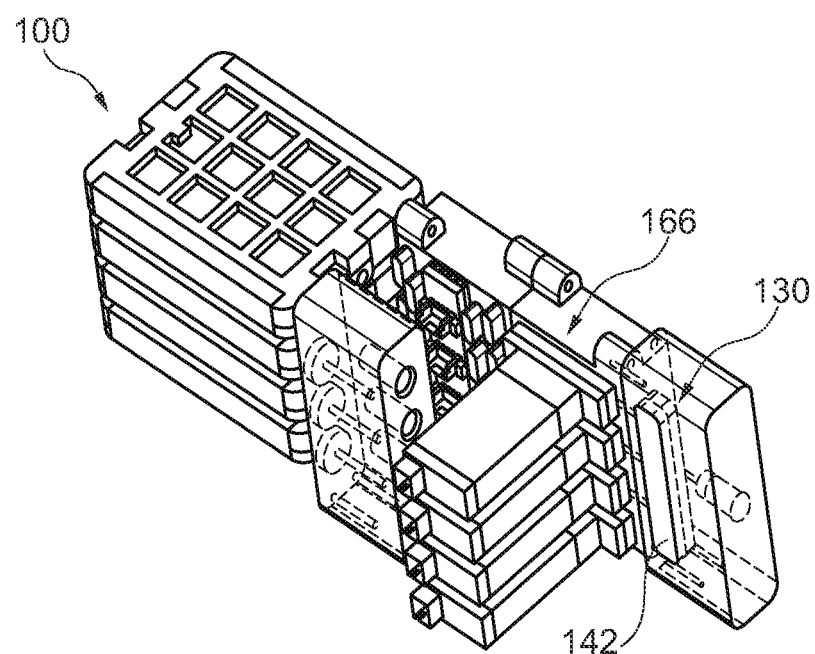
FIG. 5 shows a fluid supply device with a plate-shaped integrally formed fluid member according to another exemplary embodiment of the invention.

FIG. 5 shows a fluid supply device 100 according to an exemplary embodiment of the invention.

FIG. 5 shows in particular the stiff plate-shaped body 142 which forms the fluid member 130 which is made of one piece or integrally formed. This fluid member 130 includes the manifold and the mixer. A valve block with the fluid valves 106 to 109 is illustrated in FIG. 6 with the reference sign 166.

FIG. 6 shows a fluid supply device 100 according to another exemplary embodiment of the invention.

In FIG. 6, four fluid component sources 156 to 159 are illustrated, wherein each of which is fluidically coupled with a respective supply conduit 102 to 105 for providing the respective fluid. The fluid component sources 156 to 159 may be configured as solvent containers. The above described fluid member 130 is connected downstream to the fluid valves 106 to 109. Furthermore, four elastic buffer units 110 are illustrated in FIG. 6, wherein each of which is fluidically coupled upstream of an assigned fluid valve 106 to 109 with an assigned one of the supply conduits 102 to 105. Each of the elastic buffer units 110 serves for buffering the fluid which flows through the respectively assigned one of the supply conduits 102 to 105. Descriptively, each of the elastic buffer units 110 serves as fluidic capacity or damper, to suppress pressure pulses or the like in the supply conduits 102 to 105. Furthermore, due to providing the elastic buffer units 110 with a variable or adjustable inner volume, a length of the supply conduits 102 to 105 up to the fluid component sources 156 to 159 may be kept short, which reduces delays with respect to the solvent supply and thus errors in the solvent composition.

In particular, it is possible to implement a tempering unit in the buffer units 110 which is configured for tempering (i.e. heating or cooling) the single solvent components. Alternatively or additionally, it is possible to implement a tempering unit which is configured for tempering (i.e. heating or cooling) the solvent mixture in the fluid member 130, in particular in its mixing unit 138. Thus, tempering the mobile phase and its solvent components, respectively, before and/ or after mixing is possible. Also by this measure, the correctness of the composition of a mobile phase which is provided from the fluid conveying unit 20 may be improved.

Figures 7, 8, 9:
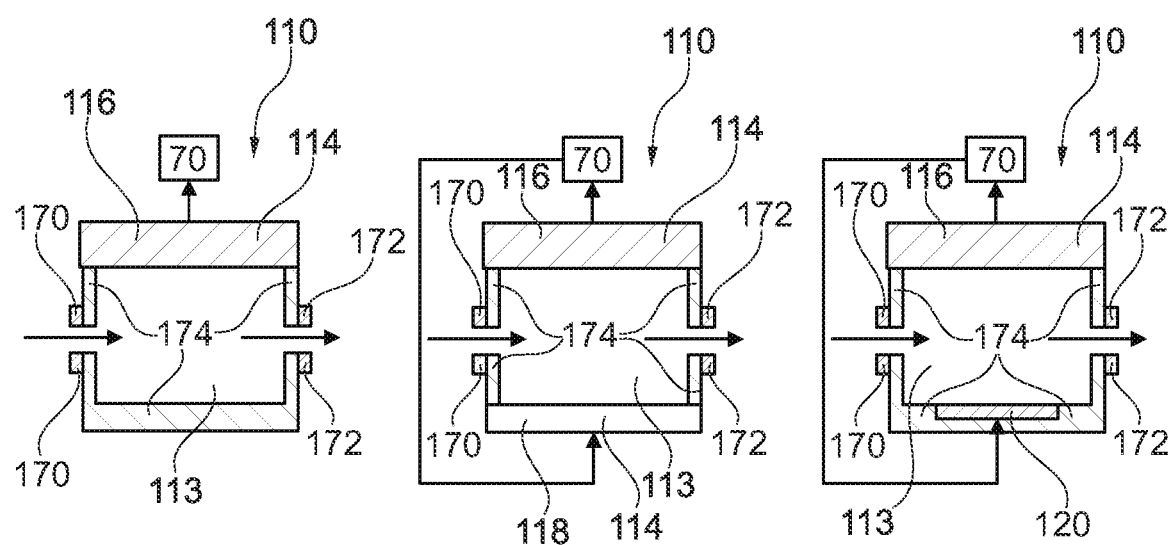
FIG. 7 shows a buffer unit of a fluid supply device according to an exemplary embodiment of the invention.
FIG. 8 shows a buffer unit of a fluid supply device according to another exemplary embodiment of the invention.
FIG. 9 shows a buffer unit of a fluid supply device according to still another exemplary embodiment of the invention.

Exemplary embodiments of buffer units 110 according to embodiments of the invention are illustrated in FIG. 7 to FIG. 9.

FIG. 7 shows a buffer unit 110 of a fluid supply device 100 according to an exemplary embodiment of the invention.

According to FIG. 7, the buffer unit 110 is configured as a member which may be fluidically connected by a fluid port 170 (for example a flange) at the side of the inlet and by a fluid port 172 (for example a further flange) at the side of the outlet to a supply conduit 102 to 105. A flow direction of the respective fluid through the buffer unit 110 is illustrated with arrows in FIG. 7. Furthermore, the buffer unit 110 comprises in its interior a variable buffer volume 113 which is delimited by a (for example stiff) housing portion 174 and an elastic compensating element 114. The elastic compensating element 114 serves for elastically compensating pressure fluctuations in the assigned supply conduit 102 to 105. Descriptively, in operation, the buffer unit 110 functions as a fluidic damping capacity, whose buffer volume 113 is enlarged in case of overpressure and reduced in case of underpressure.

Furthermore, in the buffer unit 110 according to FIG. 7, the elastic compensating element 114 is realized by an electroactive polymer. For example, the elastic compensating element 114 according to FIG. 7 may be configured as a membrane, preferably as silicone membrane. More precisely, the elastic compensating element 114 may form or include a sensor unit 116 of the buffer unit 110. This sensor unit 116 contains a sensor membrane for detecting a sensor information which is related to the fluid in the supply conduit 102 to 105. This sensor information may be a pressure or a flow rate of fluid in the supply conduit 102 to 105, for example. Depending on the pressure and/or the flow rate of the fluid, the sensor membrane is deflected more strongly or more weakly, which may be captured by measurement due to the realization of the sensor membrane from an electroactive polymer. Corresponding sensor data may be transferred to a control unit 70 which may capture the pressure and/or the flow rate of the fluid from the sensor data.

FIG. 8 shows a buffer unit 110 of a fluid supply device 100 according to another exemplary embodiment of the invention.

In addition to the members according to FIG. 7 (including the first elastic compensating element 114 shown in FIG. 7), the buffer unit 110 according to FIG. 8, as a part of its inner wall, has a further (or second) elastic compensating element 114 in the form of the membrane made of an electroactive polymer, such as silicone. The further elastic compensating element 114 is configured as an actor unit 118 of the buffer unit 110 for influencing an effect of the buffer unit 110 on the fluid. For this purpose, the further elastic compensating element 114 is actively controllable by providing electric control signals by the control unit 70. For example, the control unit 70 may apply such an electric voltage to the further elastic compensating element 114, that thereby the elasticity of the further elastic compensating element 114 and thus of the buffer unit 110 as a whole can be changed between a more rigid and a more flexible configuration, or also in a stepless or continuous manner. It is also possible to exert a force by the further elastic compensating element 114 on a fluid in the buffer volume 113 and/or in the supply conduit 102 to 105 which is fluidically coupled with it, for example in order to convey or drive this fluid.

Alternatively to the configuration according to FIG. 8, the (first) elastic compensating element 114 which is configured as a sensor membrane may also be omitted.

FIG. 9 shows a buffer unit 110 of a fluid supply device 100 according to yet another exemplary embodiment of the invention.

The embodiment according to FIG. 9 differs from the embodiment according to FIG. 7 by the fact that the buffer unit 110 at its inner wall comprises a tempering unit 120 for selectively heating and/or cooling the fluid in the buffer volume 113. For example, the tempering unit 120 may be controlled by the control unit 70 and may be configured as a Peltier element, for example.

Figure 10:
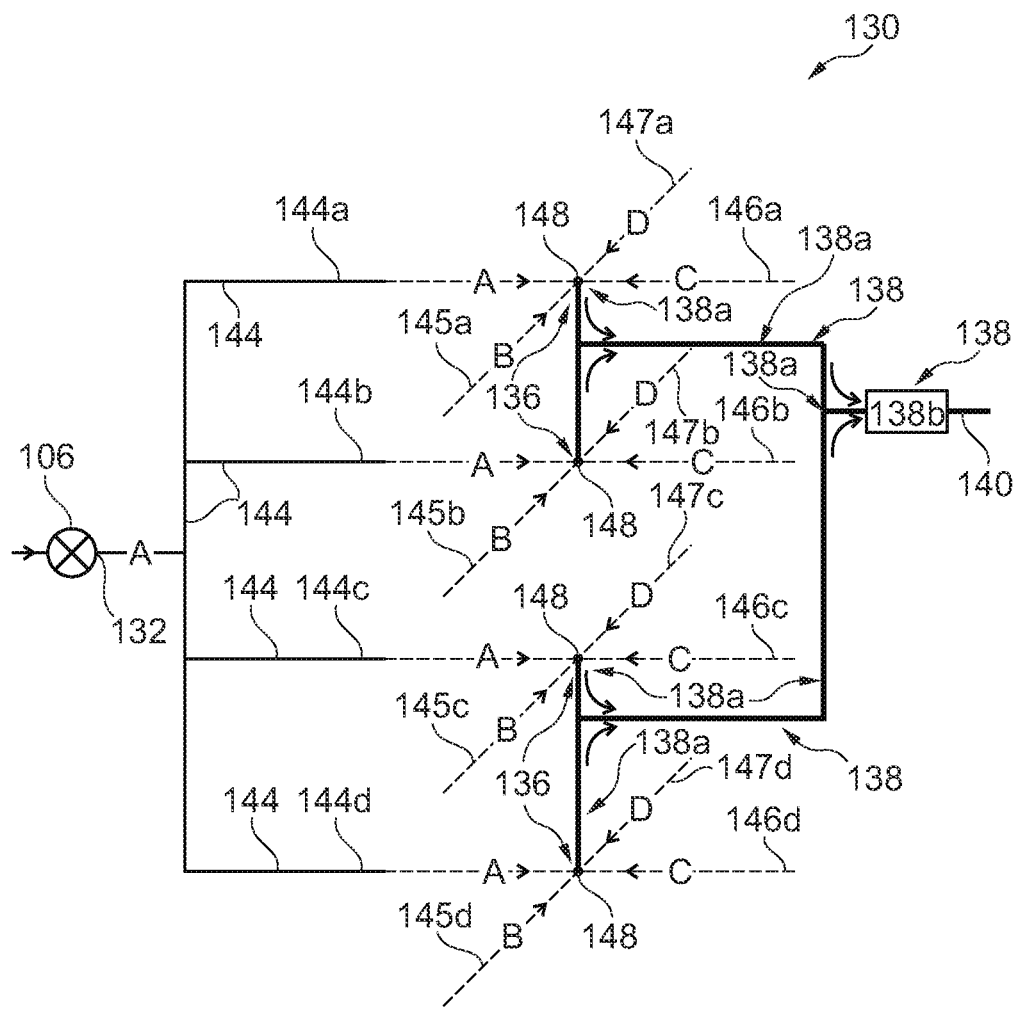
FIG. 10 shows a fluid combining unit with a subsequent mixing unit for a preferably integrally formed fluid member according to an exemplary embodiment of the invention.

FIG. 10 shows a fluid combining unit 136 with a subsequent mixing unit 138 for a (preferably integrally formed) fluid member 130 according to an exemplary embodiment of the invention.

The fluid combining unit 136 which is illustrated in FIG. 10 serves at first for splitting each fluid which is supplied at a respective one of the fluid inlets 132 to 135 into multiple respective partial channels 144*a-d* to 147*a-d*. The embodiment according to FIG. 10 concerns mixing the four fluids A, B, C and D. For the fluid A, it is illustrated how it is provided downstream of a fluid valve 106 at a fluid inlet 132. Downstream of the fluid inlets 132, the fluid A is split into the four partial channels 144*a-d*. Although not illustrated in detail in FIG. 10, correspondingly splitting for the fluids B, C and D into the partial channels 145*a-d* to 147*a-d* is performed. At each of the, in the illustrated embodiment four, combining positions 148, different partial channels 144*a-d* to 147*a-d* which are assigned to the fluids A, B, C and D are combined with each other. In more detail, at a first combining position 148, the fluid A from the partial channel 144*a*, the fluid B from the partial channel 145*a*, the fluid C from the partial channel 146*a*, and the fluid D from the partial channel 147*a* are combined with each other. In a corresponding manner, at a second combining position 148, the fluid A from the partial channel 144*b*, the fluid B from the partial channel 145*b*, the fluid C from the partial channel 146*b*, and the fluid D from the partial channel 147*b* are combined with each other, etc. In this way, at each of the combining positions 148, a respective combined flow of the different fluids A, B, C, and D is obtained. As illustrated in FIG. 10, the fluid combining unit 136 is further configured to supply the flows which are combined at the combining positions 148 to a mixing unit 138 for mixing. In the illustrated embodiment, mixing is already performed in a fluidic conduit network 138*a* between the combining positions 148 and a meander-mixer 138*b* which is illustrated as a block. It is also possible to configure the mixing unit 138 only as asymmetrical conduit network 138*a* or only as meander-mixer 138*b*.

Thus, according to FIG. 10, for a more robust combination, a combining position 148 may be parallelized into multiple cascades. If a combining position 148 is blocked, it is compensated by the other, still active combining positions 148, which thereby make combining the fluids A, B, C, and D redundant. This is advantageous in particular in the case of high salt loads. In the illustrated embodiment, a respective valve 106 to 109 with its outlet, for example a channel corresponding to the fluid A, is introduced into a distributing structure which leads to multiple similar combining positions 148. The channel structure is configured such that in T- or X-positions, respectively parallel fluid compositions are present. Thus, according to FIG. 10, combining in parallel in multiple similar combining positions 148 is enabled by a fluidic tree-structure, which is subsequently introduced into a mixing unit 138 (for example a mixing-meander-structure or a mixing unit according to FIG. 3). The illustrated embodiment corresponds to a mixing structure for a four-channel-multi gradient valve with four parallelized combining positions 148.

It should be noted that the term "comprise" does not exclude other elements and that the term "a" does not exclude a plurality. Also elements which are described in connection with different embodiments may be combined. It

The invention claimed is:

1. An integrally formed fluid member for combining and mixing fluids for forming a mobile phase in a fluid supply device, the integrally formed fluid member comprising:
    a plurality of fluid inlets, wherein a respective fluid is suppliable at each of the fluid inlets;
    a fluid combining unit for combining the fluids which are supplied at the fluid inlets; and
    a mixing unit for mixing the combined fluids and for providing the mixed fluids as mobile phase at a fluid outlet, wherein the mixing unit is a passive mixing unit without movable parts,
    and wherein the plurality of fluid inlets, the fluid combining unit, and the mixing unit are formed as single integral body.

2. The integrally formed fluid member according to claim 1, comprising at least one of the following features:
    configured as stiff body with fluid channels which extend originating from the fluid inlets via at least one combining position of the fluids and then through the mixing unit up to the fluid outlet;
    wherein the fluid member is shaped as a plate and/or is configured as an injection molded part or as a laminate;
    wherein the fluid combining unit comprises inlet channels which are fluidically coupled with the fluid inlets, which are combined to a single outlet channel at a combining position, which leads to the mixing unit;
    wherein the fluid combining unit comprises inlet channels which are fluidically coupled with the fluid inlets, which are combined to a single outlet channel at a combining position, which leads to the mixing unit, wherein the inlet channels and the combining position form a substantially X-shaped fluidic structure or an array of, in particular substantially X-shaped, introducing structures;
    wherein the mixing unit is configured for splitting the combined fluids into multiple separate fluid streams in different mixing channels and for recombining the fluid streams from the mixing channels to the mixed mobile phase;
    wherein the mixing unit is configured for splitting the combined fluids into multiple separate fluid streams in different mixing channels and for recombining the fluid streams from the mixing channels to the mixed mobile phase, wherein the different mixing channels are configured to predetermine different flow times for the different flow streams;
    wherein the mixing unit is configured as elongated structure;
    wherein the fluid member comprises a sensor unit for detecting a sensor information which is related to the single fluids and/or the mobile phase, wherein the sensor information is selected from the group consisting of: a pressure of the single fluids and/or the mobile phase; a flow rate of the single fluids and/or the mobile phase; and a temperature of the single fluids and/or the mobile phase;
    wherein the fluid member comprises a tempering unit for tempering the single fluids and/or the mobile phase so as to heat and/or cool the single fluids and/or the mobile phase;
    which is made of one material;
    wherein the fluid combining unit is configured for splitting each fluid which is supplied at a respective one of the fluid inlets into multiple respective partial channels, and is further configured to combine the partial channels which are assigned to different ones of the fluids at each of a plurality of combining positions, to thereby obtain a respective combined flow of the different fluids at each of the combining positions, and wherein the fluid combining unit is further configured to supply the flows which are combined at the combining positions to the mixing unit for mixing.

3. A fluid supply device for providing a mobile phase for a sample separating device, the fluid supply device comprising:
    a plurality of supply conduits, wherein each supply conduit is configured for providing a respective fluid which commonly form the mobile phase;
    a plurality of fluid valves, wherein each fluid valve is fluidically coupled with a respective one of the supply conduits, and wherein each fluid valve, depending on its switching state, enables or prevents a passing of the respective fluid from the respective supply conduit;
    an integrally formed fluid member according to claim 1, whose fluid inlets are coupled with the fluid valves and at whose fluid outlet the mobile phase is provided; and
    a fluid conveying unit which is fluidically coupled with the fluid outlet for conveying the mobile phase.

* * * * *